(12) United States Patent
Kannan et al.

(10) Patent No.: US 11,238,872 B2
(45) Date of Patent: Feb. 1, 2022

(54) METHOD AND APPARATUS FOR MANAGING AGENT INTERACTIONS WITH ENTERPRISE CUSTOMERS

(71) Applicant: [24]7.ai, Inc., San Jose, CA (US)

(72) Inventors: Pallipuram V. Kannan, Saratoga, CA (US); Anand Sinha, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 1 day.

(21) Appl. No.: 16/197,063

(22) Filed: Nov. 20, 2018

(65) Prior Publication Data

US 2019/0156838 A1    May 23, 2019

Related U.S. Application Data

(60) Provisional application No. 62/589,941, filed on Nov. 22, 2017.

(51) Int. Cl.
| | |
|---|---|
| *G10L 15/22* | (2006.01) |
| *G10L 17/26* | (2013.01) |
| *G10L 15/18* | (2013.01) |
| *G06K 9/00* | (2006.01) |
| *H04M 3/51* | (2006.01) |
| *G10L 15/26* | (2006.01) |
| *G10L 25/63* | (2013.01) |

(52) U.S. Cl.
CPC .......... *G10L 17/26* (2013.01); *G06K 9/00302* (2013.01); *G10L 15/1807* (2013.01); *G10L 15/22* (2013.01); *G10L 15/26* (2013.01); *H04M 3/5175* (2013.01); *G10L 25/63* (2013.01); *G10L 2015/227* (2013.01); *H04M 2201/18* (2013.01)

(58) Field of Classification Search
CPC .................................................. G06K 9/00302
USPC ........................................................ 704/270
See application file for complete search history.

(56) References Cited

U.S. PATENT DOCUMENTS

| | | |
|---|---|---|
| 2009/0110182 A1 | 4/2009 | Knight, Jr. et al. |
| 2010/0278218 A1 | 11/2010 | Yu et al. |
| 2014/0163960 A1* | 6/2014 | Dimitriadis ............. G10L 25/48 704/9 |

(Continued)

OTHER PUBLICATIONS

S. Alter, "System Interaction Patterns," 2016 IEEE 18th Conference on Business Informatics (CBI), Paris, 2016, pp. 16-25, doi: 10.1109/CBI.2016.11. (Year: 2016).*

(Continued)

*Primary Examiner* — Bharatkumar S Shah
(74) *Attorney, Agent, or Firm* — Perkins Coie LLP; Michael Glenn

(57) ABSTRACT

A method and apparatus for managing agent interactions with customers of an enterprise are disclosed. The method includes generating a value representative of an emotional state of a customer engaged in an ongoing interaction with a virtual agent (VA) associated with the enterprise. The value is generated based, at least in part, on one or more inputs provided by the customer during the ongoing interaction. The value is compared with a predefined emotional threshold range to determine whether the emotional state of the customer is a non-neutral state. The ongoing interaction is deflected to one of a human agent and a specialized VA capable of empathetically handling the ongoing interaction if it is determined that the emotional state of the customer is the non-neutral state.

14 Claims, 7 Drawing Sheets

(56) References Cited

U.S. PATENT DOCUMENTS

| | | |
|---|---|---|
| 2014/0314225 A1 | 10/2014 | Riahi et al. |
| 2015/0281445 A1 | 10/2015 | Kumar et al. |
| 2015/0358463 A1* | 12/2015 | O'Connor ........... H04M 3/5166 |
| | | 379/88.02 |
| 2016/0191712 A1* | 6/2016 | Bouzid ............... H04M 3/5232 |
| | | 379/265.12 |
| 2016/0210985 A1* | 7/2016 | Deleeuw ................. G10L 15/22 |
| 2020/0153965 A1* | 5/2020 | Dougherty .............. H04L 51/04 |

OTHER PUBLICATIONS

S. Alter, "System Interaction Patterns," 2016 IEEE 18th Conference on Business Informatics (CBI), Paris, 2016, pp. 16-25, doi: 10.1109/CBI.2016.11. (Year: 2016) (Year: 2016).*

* cited by examiner

METHOD AND APPARATUS FOR MANAGING AGENT INTERACTIONS WITH ENTERPRISE CUSTOMERS

CROSS REFERENCE TO RELATED APPLICATIONS

This application claims priority to U.S. provisional patent application Ser. No. 62/589,941, filed Nov. 22, 2017, which is incorporated herein in its entirety by this reference thereto.

TECHNICAL FIELD

The present technology generally relates to interactions between customers and agents of an enterprise, and more particularly to a method and apparatus for managing agent interactions with enterprise customers.

BACKGROUND

Typically, a customer may wish to converse with a customer support representative of an enterprise to enquire about products/services of interest, to resolve concerns, to make payments, to lodge complaints, and the like. To serve such a purpose, the enterprises may deploy both, live and automated conversational agents to interact with the customers and provide them with desired assistance.

Generally, when a customer contacts customer support using speech or text interface, the first interaction takes place with an automated conversational agent, also referred to herein as a Virtual Agent (VA). The VA may use Natural Language Processing (NLP) algorithms and special grammar to interpret customer's natural language inputs, whether provided in a spoken form or a textual form and respond appropriately. Typically, for each query posed by the customer, the VA is configured to perform NLP of the query, extract the key intent of the query, look up its repository for the intent of the query and provide an answer to the customer.

Typically, standard VAs do not take customer emotions and sentiments into account while responding to customer queries. In an illustrative example, if a customer's issue has not been resolved even after contacting the customer support, the customer may interact with the VA in an angry mood. The standard VA may not have been trained to handle certain emotions, such as anger for instance. As a result, the VA may not be able to engage with the customer using a right level of empathy, which may degrade a quality of customer experience.

Moreover, many times, if a VA is unable to interpret the query or is unable to find a match in a query response database to a properly interpreted query, it is designed to deflect the interaction to a human agent. A large number of interactions get handed over to human agents, who are trained to engage with the customers using the right level of empathy. As a result of such deflections, time spent on interactions by the human agents increases substantially, which may not be preferred by the enterprises.

In view of the foregoing, there is need to manage agent interactions with enterprise customers in a manner that does not degrade customer experience irrespective of whether the support is provided by a VA or a human agent. Moreover, it would be advantageous to provide the desired assistance to the customers and with the right level of empathy.

SUMMARY

In an embodiment of the invention, a computer-implemented method for managing agent interactions with enterprise customers is disclosed. The method generates, by a processor, a value representative of an emotional state of a customer engaged in an ongoing interaction with a virtual agent (VA) associated with an enterprise. The value is generated based, at least in part, on one or more inputs provided by the customer during the ongoing interaction. The method determines, by the processor, whether the emotional state of the customer is a non-neutral state by comparing the value with a predefined emotional threshold range. The method deflects, by the processor, the ongoing interaction to one of a human agent and a specialized VA capable of empathetically handling the ongoing interaction if it is determined that the emotional state of the customer is the non-neutral state.

In an embodiment, an apparatus for managing agent interactions with enterprise customers is disclosed. The apparatus includes a processor and a memory. The memory stores instructions. The processor is configured to execute the instructions and thereby cause the apparatus to generate a value representative of an emotional state of a customer engaged in an ongoing interaction with a virtual agent (VA) associated with the enterprise. The value is generated based, at least in part, on one or more inputs provided by the customer during the ongoing interaction. The apparatus determines whether the emotional state of the customer is a non-neutral state by comparing the value with a predefined emotional threshold range. The apparatus deflects the ongoing interaction to one of a human agent and a specialized VA capable of empathetically handling the ongoing interaction if it is determined that the emotional state of the customer is the non-neutral state.

In an embodiment of the invention, another computer-implemented method for managing agent interactions with enterprise customers is disclosed. The method performs, by a processor, natural language processing of one or more inputs provided by a customer during an ongoing interaction with a virtual agent (VA) associated with the enterprise. The natural language processing is performed to identify at least one parameter. The method determines, by the processor, a value representative of an emotional state of the customer based, at least in part, on the at least one parameter. The method determines, by the processor, whether the emotional state of the customer is a non-neutral state by comparing the value with a predefined emotional threshold range. The method determines, by the processor, an availability of a specialized VA capable of empathetically handling the ongoing interaction if it is determined that the emotional state of the customer is the non-neutral state. If the specialized VA is determined to be available, the method determines by the processor, whether the specialized VA has previously engaged in an interaction with the customer. If the specialized VA has previously engaged in the interaction with the customer, the method determines, by the processor, if an outcome of the previous interaction was successful. The method deflects, by the processor, the ongoing interaction from the VA to the specialized VA if the outcome of the previous interaction was successful. The ongoing interaction is deflected from the VA to a human agent if the specialized VA is determined to be unavailable or if the outcome of the previous interaction was unsuccessful.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
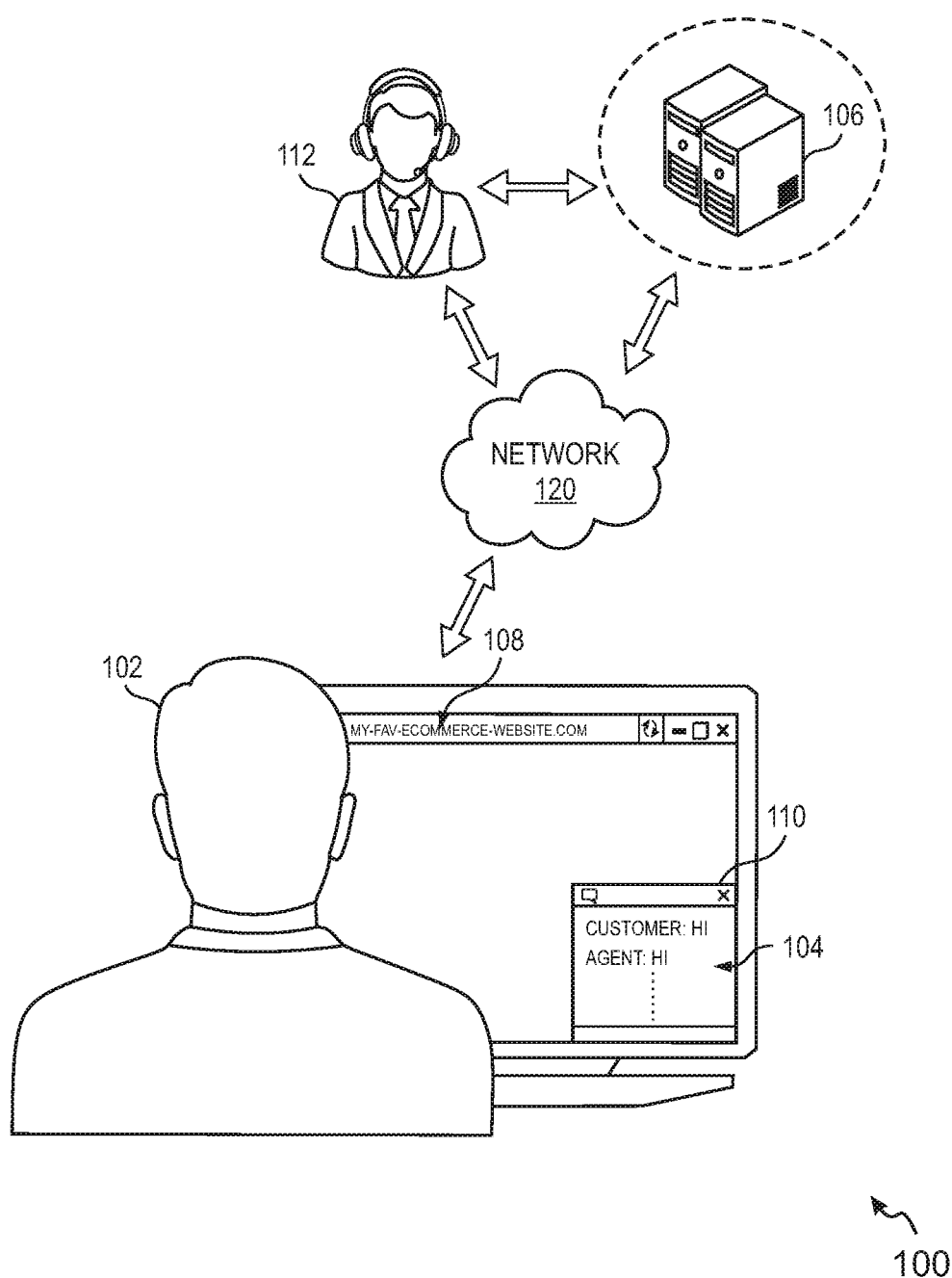
FIG. 1 shows a representation of a customer engaged in a chat conversation with an automated conversational agent, in accordance with an embodiment of the invention.

FIG. 1 shows a representation 100 of a customer 102 engaged in a chat interaction 104 with an automated conversational agent 106, in accordance with an embodiment of the invention. In an illustrative example, the customer 102 may be browsing a Website 108 of an enterprise and wish to seek assistance from a customer support representative during a current visit to the enterprise Website 108. Most enterprises typically display widgets or hyperlinks on their Website, which are associated with text such as 'Let's Chat' or 'Need Assistance, Click Here!'. The customer 102 may click on the widget or the hyperlink to seek assistance. Upon receiving a selection input corresponding to the widget or the hyperlink, a chat console such as a chat console 110 may be displayed to the customer 102. The customer 102 may thereafter engage in a textual chat conversation/interaction with an agent, such as the automated conversational agent 106, for receiving desired assistance. The automated conversational agent 106 is hereinafter referred to as a virtual agent (VA) 106. In some example scenarios, the customer 102 may also call a customer care number displayed on the enterprise Website 108 and connect with an automated conversational agent, such as for example an interactive voice response (IVR) system, to seek assistance therefrom. The interaction may be embodied as voice interaction in such a scenario. In some example scenarios, upon clicking on the widget or on the hyperlink, the customer 102 may be connected to a live agent, i.e. a human agent, instead of an automated conversational agent. Similarly, in some scenarios, upon calling the customer care number, the customer 102 may be connected to the human agent for engaging in a voice interaction.

The interaction between the customer 102 and the VA 106 may be achieved over a communication network such as a network 120. Examples of the network 120 may include wired networks, wireless networks or a combination thereof. Examples of a wired network may include Ethernet, local area network (LAN), fiber-optic cable network, and the like. Examples of wireless network may include a cellular network like GSM/3G/4G/CDMA network, a wireless LAN, a Blue-tooth or Zigbee network, and the like. An example of combination of wired and wireless networks may include the Internet. The interactions between customers and the agents (for example, human agents and VAs) may be stored as chat transcripts in a server associated with the customer support center for subsequent analysis and learning purposes.

Typically, VAs (also referred to hereinafter as standard VAs) are not trained to take emotions and sentiments into consideration while responding to customer queries. For example, a standard VA may not have been trained to handle certain emotions, such as frustration, anger, disappointment, anxiety, and the like. As a result, in many example scenarios, the VAs may not be able to engage with the customers using a right level of empathy, which may degrade a quality of customer experience. Moreover, many times, if the VA 106 is unable to interpret the query or is unable to find a match in a query response database to a properly interpreted query, it is designed to deflect the interactions to a human agent, such as a human agent 112. It is observed that a large number of interactions get handed over to human agents, who are trained to engage with the customers using the right level of empathy. As a result of such deflections, time spent on interactions by human agents increases substantially, which may not be preferred by the enterprises.

Various embodiments of the present technology provide a method and apparatus that are capable of overcoming these and other obstacles and providing additional benefits. More specifically, various embodiments of the present technology disclosed herein disclose techniques for managing agent interactions in a manner that provides desired assistance to the customers and with the right level of empathy. Moreover, the techniques disclosed herein are configured to ensure that the quality of the customer experience does not degrade irrespective of whether the support is provided by a VA or a human agent.

In at least one example embodiment, the apparatus (shown in FIG. 2) is configured to determine whether an emotional state of the customer corresponds to a non-neutral state. A non-neutral state of the customer implies that the customer is agitated, frustrated, sad or in general not engaging in a normal conversation with the VA. If the customer is determined to be in a non-neutral state, then the apparatus is configured to determine if there exists a specialized VA equipped to interact with the customer with the right level of empathy. If such a specialized VA is determined to exist, then the apparatus is configured to determine if the specialized VA has interacted with the customer before and if the customer was satisfied with the interaction or not. If the specialized VA has not previously interacted with the customer, then the customer interaction may be deflected to the specialized VA. If the specialized VA had interacted with the customer previously and the customer was not satisfied with the interaction, then the apparatus may be configured to deflect the interaction to a human agent, who may then assist the customer with the right level of empathy. Such switching (or deflection) of interaction to an agent capable of assisting the customer and with the right level of empathy ensures high quality of customer experience to the customer while ensuring that customer experience does not degrade irrespective of whether the support is provided by a VA or a human agent. An apparatus configured to manage agent interactions in such a manner is explained in detail with reference to FIG. 2.

Figure 2:
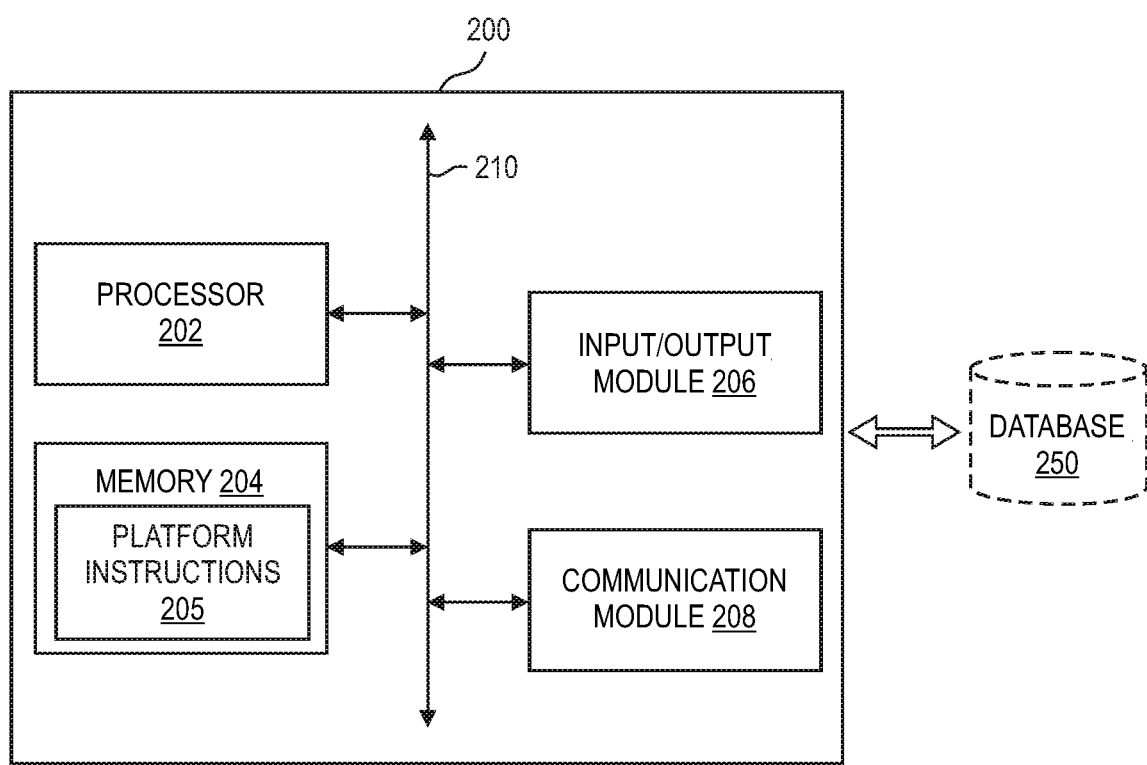
FIG. 2 is a block diagram of an apparatus configured to manage agent interactions with enterprise customers, in accordance with an embodiment of the invention.

FIG. 2 is a block diagram of an apparatus 200 configured to manage agent interactions with enterprise customers, in accordance with an embodiment of the invention. The term 'agents' as used herein and throughout the description may refer to automated conversational agents or to human agents. Further, automated conversational agents include chatbots, i.e. automated agents configured to assist customers using textual chat conversation medium, and Interactive Voice Response (IVR) systems, i.e. automated agents configured to assist customers using a voice conversation medium. The automated conversational agents are hereinafter referred to as Virtual Agents (VAs) or standard VAs. Some VAs are trained to handle specific customer emotions, such as anger for instance, and such VAs are referred to hereinafter as specialized VAs.

The term 'managing agent interactions with enterprise customers' as used herein implies ensuring selection of an appropriate agent, whether VA or human agent, for each customer interaction, such that the customer is provided with the desired assistance and with the right level of empathy. Moreover, the term 'enterprise' as used herein may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise. The enterprise may be associated with potential and existing users of products, services and/or information offered by the enterprise. Such existing or potential users of enterprise offerings are interchangeably referred to herein as customers of the enterprise or as enterprise customers.

In one embodiment, the apparatus 200 is embodied as an interaction platform. The one or more components of the interaction platform may be implemented as a set of software layers on top of existing hardware systems. The interaction platform may be communicably coupled, over a communication network, such as the network 120 shown in FIG. 1, with interaction channels and/or data gathering Web servers linked to the interaction channels to receive information related to customer interactions in an ongoing manner in substantially real-time. Further, the interaction platform is in operative communication with VAs and electronic devices of the human agents of one or more enterprises and configured to receive information related to customer-enterprise interactions from them.

The apparatus 200 includes at least one processor, such as a processor 202 and a memory 204. Although the apparatus 200 is depicted to include only one processor, the apparatus 200 may include more number of processors therein. In an embodiment, the memory 204 is capable of storing machine executable instructions, referred to herein as platform instructions 205. Further, the processor 202 is capable of executing the platform instructions 205. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories, such as mask ROM, PROM (programmable ROM), EPROM (erasable PROM), flash memory, RAM (random access memory), etc.; magnetic storage devices, such as hard disk drives, floppy disks, magnetic tapes, etc.; optical magnetic storage devices, e.g. magneto-optical disks, CD-ROM (compact disc read only memory), CD-R (compact disc recordable), CD-R/W (compact disc rewritable), DVD (Digital Versatile Disc), and BD (BLU-RAYED Disc).

In at least some embodiments, the memory 204 is configured to store NLP logic and machine learning algorithms for facilitating determination of customer's emotional state. Further, the memory 204 may also be configured to include logic for determining predefined emotional threshold range for comparing the numerical values representative of the emotional state with, based on which deflection/switching of the interaction from current VA to a specialized VA or a human agent may be performed during the ongoing interactions.

The apparatus 200 also includes an input/output module 206 (hereinafter referred to as an 'I/O module 206') and at least one communication module such as a communication module 208. In an embodiment, the I/O module 206 may include mechanisms configured to receive inputs from and provide outputs to the user of the apparatus 200. To that effect, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

The communication module 208 may include several channel interfaces to receive information from a plurality of enterprise interaction channels. Some non-exhaustive examples of the enterprise interaction channels may include a Web channel, i.e. an enterprise Website, a voice channel, i.e. voice-based customer support, a chat channel, i.e. a chat support, a native mobile application channel, a social media channel, and the like. Each channel interface may be associated with a respective communication circuitry such as for example, a transceiver circuitry including antenna and other communication media interfaces to connect to a wired and/or wireless communication network. The communication circuitry associated with each channel interface may, in at least some example embodiments, enable transmission of data signals and/or reception of signals from remote network entities, such as Web servers hosting enterprise Website or a server at a customer support and service center configured to maintain real-time information related to interactions between customers and agents.

In at least one example embodiment, the channel interfaces are configured to receive up-to-date information related to the customer-enterprise interactions from the enterprise interaction channels. In some embodiments, the information may also be collated from the plurality of devices used by the customers. To that effect, the communication module 208 may be in operative communication with various customer touch points, such as electronic devices associated with the customers, Websites visited by the customers, devices used by customer support representatives, for example voice agents, chat agents, IVR systems, in-store agents, and the like, engaged by the customers, and the like.

The communication module 208 may further be configured to receive information related to customer interactions with agents, such as voice or chat interactions between customers and conversational agents, for example automated conversational agents or human agents, being conducted using various interaction channels, in real-time and provide the information to the processor 202. In at least some embodiments, the communication module 208 may include relevant Application Programming Interfaces (APIs) to communicate with remote data gathering servers associated with such enterprise interaction channels. Moreover, the communication between the communication module 208 and the remote data gathering servers may be realized over various types of wired or wireless networks.

In an embodiment, various components of the apparatus 200, such as the processor 202, the memory 204, the I/O module 206 and the communication module 208 are configured to communicate with each other via or through a centralized circuit system 210. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

The apparatus 200 as illustrated and hereinafter described is merely illustrative of an apparatus that could benefit from embodiments of the invention and, therefore, should not be taken to limit the scope of the invention. The apparatus 200 may include fewer or more components than those depicted in FIG. 2. In an embodiment, one or more components of the apparatus 200 may be deployed in a Web Server. In another embodiment, the apparatus 200 may be a standalone component in a remote machine connected to a communication network and capable of executing a set of instructions, sequential and/or otherwise, to manage agent interactions with enterprise customers. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as agents' devices. In another embodiment, the apparatus 200 may be a central system that is shared by or accessible to each of such devices.

The apparatus 200 is depicted to be in operative communication with a database 250. The database 250 is any computer-operated hardware suitable for storing and/or retrieving data, such as, but not limited to, a registry of standard and specialized VAs, a registry of human agents, emotional profiles of the plurality of customers, and the like. The database 250 may include multiple storage units such as hard disks and/or solid-state disks in a redundant array of inexpensive disks (RAID) configuration. The database 250 may include a storage area network (SAN) and/or a network attached storage (NAS) system.

In some embodiments, the database 250 is integrated within the apparatus 200. For example, the apparatus 200 may include one or more hard disk drives as the database 250. In other embodiments, the database 250 is external to the apparatus 200 and may be accessed by the apparatus 200 using a storage interface (not shown in FIG. 2). The storage interface is any component capable of providing the processor 202 with access to the database 250. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the database 250.

In at least one embodiment, the communication module 208 may be configured to receive a request for an agent interaction with a customer support representative. As explained with reference to FIG. 1, a customer may request an agent interaction by clicking on a widget or on a hyperlink on the Website displayed on the enterprise Website. The widget or the hyperlink may be configured to display text such as 'Let's Chat' or 'Need Assistance, Click Here!'. The customer may click on the widget or the popup to seek assistance. In some example scenarios, the customer may also call a customer care number displayed on the enterprise Website to request an interaction with the agent. In at least some embodiments, the communication module 208 may be configured to receive such a request for interaction from the customer and forward the request to the processor 202. The processor 202 may be configured to use initial interaction handling logic stored in the memory 204 and, in conjunction with the registry of standard VAs stored in the database 250, determine a standard VA for interacting with the customer. In embodiments, the next available standard VA from among a pool of standard VAs may be selected for conducting the interaction with the customer. In another embodiment, a high-level intent may be predicted based on the customer's current and/or past interaction history and the standard VA capable of handling customers for the predicted intent may be selected for conducing the interaction with the customer. In yet another embodiment, a customer's persona may be predicted based on current and past journeys of the customer on the enterprise interaction channels, and a standard VA more suited to a customer's persona type may be selected for conducting the interaction with the customer. The selected standard VA may thereafter initiate the interaction with the customer.

In an embodiment, the processor 202 is configured to receive customer interaction inputs provided by the customer during an ongoing interaction with a standard virtual agent (VA) associated with the enterprise. The terms standard VA and VA are used interchangeably hereinafter. The customer inputs are received by the processor 202 in an ongoing manner and in substantially real-time on account of the communication module 208 being in operative communication with the standard VA and the customer's device.

The processor 202 is configured to generate a value representative of an emotional state of a customer based, at least in part, on one or more inputs provided by the customer during the ongoing interaction. The term 'emotional state of the customer' as used herein refers to an emotion that the customer is currently experiencing. In an illustrative example, the emotional state of the customer may be 'angry' if the customer is currently experiencing the emotion 'anger'. In another illustrative example, the emotional state of the customer may be 'happy' if the customer is currently experiencing the emotion 'happiness'. The customers of the enterprise may exhibit a range of emotions and sentiments during the course of their interactions with the agents of the enterprise. The term 'emotion' refers to a complex psychological state of the customer such as happiness, sadness, anger, fear, surprise, love, disgust, etc. Further, the term 'sentiment' refers to a mental attitude of the customer that is created through the existence of an emotion. For example, the customer may be frustrated or annoyed under the existence of the emotion 'anger' or the customer may be content or calm or relaxed under the existence of the emotion 'happiness' and so on.

The processor 202 is configured to perform Natural Language Processing (NLP) of the one or more inputs provided by the customer during the ongoing interaction to identify at least one parameter. For example, the words expressing emotion, such as for example words like 'disappointed', 'unacceptable', 'delay', etc., may be extracted by performing NLP and using other machine learning (ML) algorithms stored in the memory 204.

In at least one embodiment, the processor 202 is configured to identify parameters from the customer inputs. More specifically, the processor 202 is configured to extract emotion bearing words and derive parameters from the extracted words. Such derivation of parameters from customer interaction inputs is referred to herein as 'identification of parameters'. The processor 202 is configured to provide the identified parameters as an input to at least one emotion detection classifier. In at least one example embodiment, the memory 204 is configured to store one or more ML models capable of emotion detection and these ML models are referred to herein as emotion detection classifiers. In an illustrative example, plurality of past interactions in which individual interaction inputs of the customers are manually tagged with emotions by human agents may be used to train a ML model, such as a Hidden Markov Model, to serve as the emotion detection classifier. The emotion detection classifier may be trained to receive parameters derived from customer inputs as an input and generate a numerical value as an output. In an example scenario, the customer may have provided the following input in terms of a service related complaint "I VISITED YOUR RESTAURANT LAST NIGHT FOR CELEBRATING MY BIRTHDAY. THE SERVICE WAS VERY SLOW AND THE FOOD SERVED WAS VERY COLD. IT RUINED MY BIRTHDAY!!" to a VA. The NLP and trained ML models may be configured to extract words like 'SLOW', 'COLD' and 'RUINED' from the customer input. It is noted that the words like 'SLOW' and 'COLD', as such are relevant to the 'restaurant' business context and stored as part of the special grammar stored in the memory 204 for being relevant to VA interactions with customers of the restaurant. The special grammar may vary for each different type of business associated with the enterprise. The processor 202 may use the special grammar stored in the memory 204 while performing NLP of the customer inputs to identify emotion-bearing words and thereafter use the identified words to derive parameters to be provided as input to an emotion detection classifier. The emotion detection classifier may be trained to generate an output in form of a numerical value. The value is representative of the emotional state of the customer. For the example mentioned above, the emotion detection classifier may generate a value of '0.8' representative of the disappointed emotional state of the customer.

In at least some embodiments, the processor 202, in addition to analyzing the words typed or spoken by the customer, may also analyze other aspects related to the VA interaction with the customer for generating a numerical value representative of the emotional state of the customer. Some non-exhaustive examples of such aspects include a speech pattern, e.g. pitch of the speech, a typing pattern, e.g. typing speed, emoticons used by the customer to express sentiment, movement of the electronic device used for interaction, e.g. the customer is walking at a faster pace while interacting using a mobile phone, facial expressions of the customer, and the like. Such information may be retrieved from a plurality of sensors such as, but not limited to, a camera, a microphone, an accelerometer, a GPS sensor, a pedometer, a pressure sensor, a heart rate monitor, and the like, present in the customer's device. As explained above, the communication module 208 on account of being in operative communication with various customer touch points, such as the electronic device associated with the customer may receive such information from the customer's electronic device and provision the information to the processor 202. The processor 202 may further be configured to input such information as additional parameters to the emotion detection classifier for generating the emotional state of the customer, i.e. for generating a numerical value representative of the emotional state of the customer. The generation of the value representative of the emotional state of customer is explained further with reference to FIG. 3.

Figure 3:
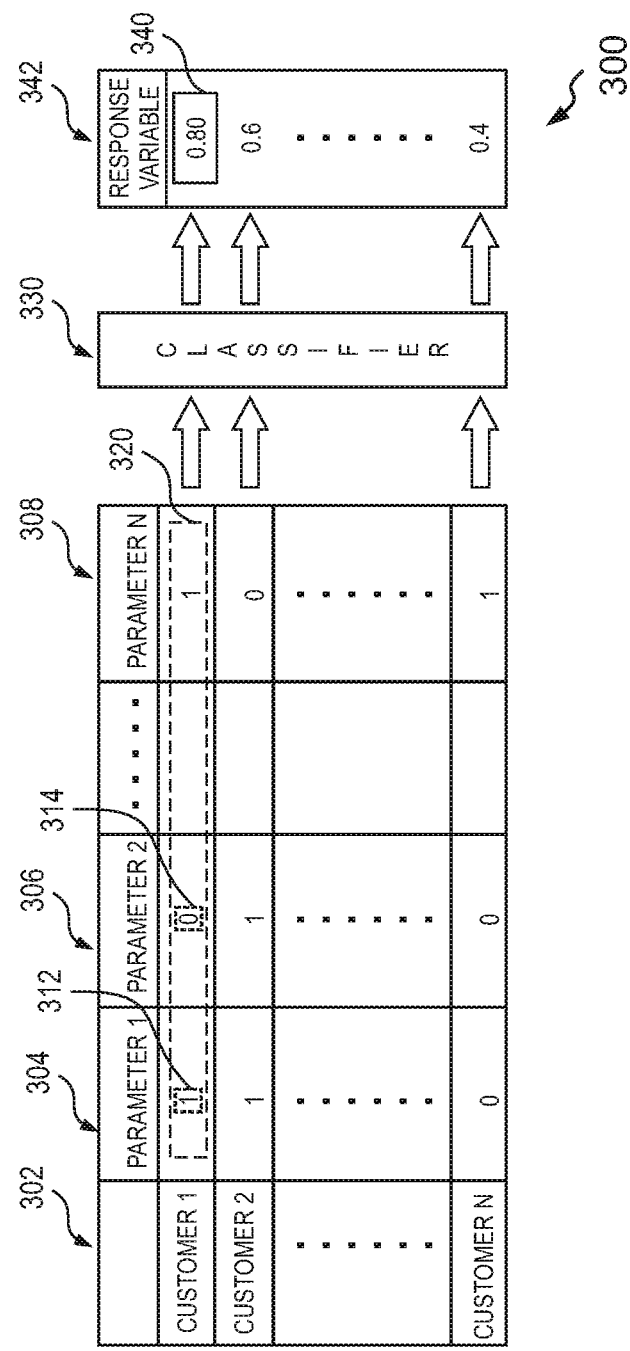
FIG. 3 shows a simplified representation of a table for illustrating generation of a value representative of an emotional state of a customer engaged in an interaction with a VA, in accordance with an embodiment of the invention.

FIG. 3 shows a simplified representation of a table 300 for illustrating generation of a value representative of an emotional state of a customer engaged in an interaction with a VA, in accordance with an embodiment of the invention.

The table 300 includes a plurality of columns, such as column 302, 304, 306 and 308. The column 302 is depicted to include a list of customers, such as 'CUSTOMER 1', 'CUSTOMER 2' and so on and so forth till 'CUSTOMER N', who are currently interacting with various VAs associated with the enterprise.

The columns 304, 306 to 308 represent parameters (shown as 'PARAMETER 1', 'PARAMETER 2' to 'PARAMETER N', respectively) derived from analysis of customer inputs and other aspects related to the customer interaction with the VA, such as customer typing speed, customer speech pattern, customer expressed emoticons, movement of the electronic device of the customer during the interaction, etc. The entries in the columns record the parameter values for the corresponding parameter for each customer. Although binary values are shown as entries in columns 304, 306 to 308, in at least some embodiments, each entry may correspond to a vector, or a numerical value, of fixed length.

In an illustrative example, the parameters 1 and 2 may correspond to parameters derived from the words used by the customer in one or more customer inputs to the VA during the interaction between the customer and the VA. More specifically, if the words in the customer input relate to a particular emotion, say 'anger' for instance, then a value of '1' may be selected for parameter 1 as shown by entry 312 in the column 304 for the customer 1. A value of '0' may have been selected as the entry 312 in the column 304 if the words in the customer input did not relate to the 'anger' emotion. Similarly, if the words in the customer input do not relate to another emotion, say 'happiness' for instance, then a value of '0' may be selected for parameter 2 as shown by entry 314 in the column 306 for the customer 1. A value of '1' may have been selected as the entry 314 in the column 306 if the words in the customer input relate to the 'happiness' emotion. Further, if the typing speed of the customer 1 is above a predefined limit, e.g. 50 words per minute, then a parameter, such as for example parameter N may be associated with a value of '1', else the value of '0' may be selected as the entry in the corresponding column, for example the column 308, for the customer 1. Similarly, other parameters may be derived from information extracted related to emoticons used by the customer 1 in the interaction with the VA, a speech pattern of the customer 1, a movement of the electronic device used by the customer 1 for conducting the interaction with the VA, and the like. Each of such parameters may be associated with a column, such as the column 304, capable of receiving entries such as the entries 312 and 314, for each customer. The parameters explained herein should be not considered to be limiting the scope of the invention and and indeed other parameters may be derived from the customer interaction with the VA.

The entries in each column from 304 to 310 for each customer configure a vector, which is provided to a classifier 330, i.e. an emotion detection classifier 330, which is trained to predict the emotional state of the customer, for example whether the customer is in a heightened state of emotion, depressed, normal, etc. For example, a vector 320 is provided to the emotion detection classifier 330 to predict the emotional state of the customer 1 during the interaction of the customer 1 with the VA.

As shown, the emotion detection classifier 330 is depicted to predict a value 340 (shown as 0.80) in a column 342 labeled 'Response Variable, i.e. the variable to be predicted, indicating that there is a very high probability (around 80%) of the customer 1 being in a heightened state of emotion, for example angry, frustrated, or any such emotion.

Referring now to FIG. 2, in at least one example embodiment, the processor 202 is configured to determine whether the emotional state of the customer is a non-neutral state by comparing the value, i.e. generated value representative of the emotional state of the customer, with a predefined emotional threshold range. In an embodiment, the predefined emotional threshold range includes at least a first predefined threshold value and a second predefined threshold value, where the second predefined threshold value less than the first predefined threshold value.

The emotional state of the customer is determined to be the non-neutral state if the value is greater than the first predefined threshold value or less than the second predefined threshold value. Further, the emotional state of the customer is determined to be a neutral state if the value is less than the first predefined threshold value and greater than the second predefined threshold value. In an illustrative example, if the value output by the emotion detection classifier is greater than a first predefined threshold value, for example above 0.6, or less than a second predefined threshold value, for example below 0.4, then the customer is identified to be in a non-neutral state. However, if the value output by the emotion detection classifier is less than the first predefined threshold value but more than the second predefined threshold value, for example from 0.4 to 0.6, then the customer is determined to be in a neutral state. It is noted that the predefined threshold values used for comparing the numerical output of the emotion detection classifier may be configurable features. The predefined emotional threshold range including the first predefined threshold value and the second predefined threshold value may be selected to be any value based on machine learning and/or empirical research. The determination of the emotional state of the customer based on the generated value representative of the emotional state of the customer is further explained with reference to an illustrative example in FIG. 4.

Figure 4:
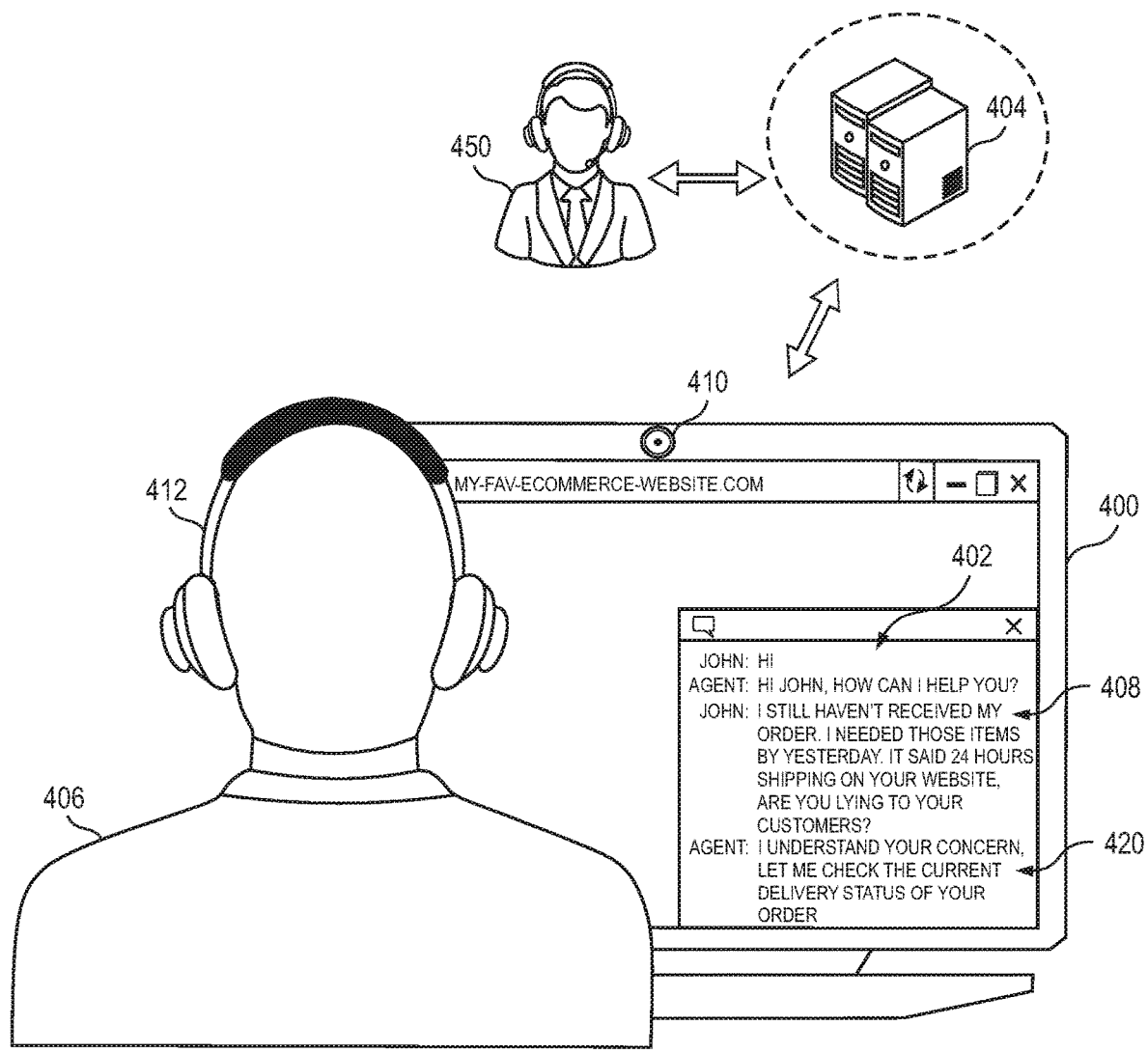
FIG. 4 shows a simplified representation of a customer's electronic device displaying an ongoing chat interaction between a standard VA and a customer, in accordance with an embodiment of the invention.

Referring now to FIG. 4, a simplified representation of a customer's electronic device 400 displaying an ongoing chat interaction 402 between a standard VA 404 and a customer 406 is shown, in accordance with an embodiment of the invention. The input provided by the standard VA 404 during the ongoing chat interaction 402 is depicted to be associated with a label 'AGENT' and the input provided by the customer 406 is depicted to be associated with a label 'JOHN', for illustration purposes. As can be seen, a customer input 408 is depicted to be associated with text 'I STILL HAVEN'T RECEIVED MY ORDER. I NEEDED THOSE ITEMS BY YESTERDAY. IT SAID 24 HOURS SHIPPING ON YOUR WEBSITE, ARE YOU LYING TO YOUR CUSTOMERS?' It is noted that in some alternate scenarios, the customer 406 may initiate a video call using a front facing camera 410 and headphones 412 (equipped with a microphone, which is not shown in FIG. 4) associated with the customer's electronic device 400. The customer input 408 whether provisioned in a textual form or a speech form by the customer 406 may be received by the communication module 208 of the system 200 (shown in FIG. 2) on account of being operatively coupled with the standard VA 404. The communication module 208 may be configured to provision the received customer input 408 to the processor 202 (shown in FIG. 2).

As explained with reference to FIGS. 2 and 3, the processor 202 is configured to interpret each customer input and derive parameters capable of being provided to an emotion detection classifier for generating a value representative of an emotional state of the customer. For example, the processor 202 may be configured to derive parameters from the emotion-bearing words, such as 'ARE YOU LYING TO YOUR CUSTOMERS?' in the customer input 408 and feed these parameters to the emotion detection classifier for generating a value representative of an emotional state of the customer 406. In an illustrative example, the generated value may be indicative of the customer 406 being in a very angry mood, i.e. in a non-neutral emotional state.

In addition to receiving the customer input 408, the processor 202 may also be configured to receive other information related to the conversation with the customer 406. For example, if the customer 406 has initiated a video call to interact with the standard VA 404, then the processor 202 may be configured to receive the video content. In at least one example embodiment, the processor 202 may be configured to use facial feature recognition algorithms stored in the memory 204 to analyze the video content and identify facial features of the customer 406 during the ongoing interaction. These facial features may be provided as an input parameter to the emotion detection classifier to generate a value representative of the emotional state of the customer 406. For example, based on the customer's facial expression during providing of the customer input 408, the processor 202 may determine that the customer 406 is in an angry mood.

In another illustrative example, a sensor associated with the customer's electronic device 400 may determine a typing speed of the customer 406 during the interaction and provision such information to the processor 202. The typing speed may be used as a parameter in generating a value representative of the emotional state of the customer 406. For example, if the customer's typing speed is 60 words per minute as compared to an average typing speed of an individual being 38-40 words per minute, then it may be determined that the customer 406 is in an agitated state of mind. As explained with reference to FIGS. 2 and 3, the emotion detection classifier may be configured to provide a numerical value representative of the emotional state of the customer. The numerical output may be compared with predefined threshold values to determine if the customer's emotional state is a non-neutral state or not.

Referring back to FIG. 2, in at least one example embodiment, if the processor 202 determines that the customer's emotional state is a neutral state, then the standard VA may be permitted to continue the interaction with the customer without any deflection of the ongoing interaction. However, if the processor 202 determines that the customer's emotional state is a non-neutral state, then the processor 202 may be configured to determine if the interaction may be switched, i.e. deflected to a specialized VA equipped to assist the customer with the right level of empathy. To that effect, the processor 202 may be configured to check the registry of specialized VAs in the database 250 to determine whether a specialized VA equipped to empathetically engage with a customer in a particular emotional state exists or not. It is noted that each specialized VA may be trained to interact with customers exhibiting a particular emotion or a set of emotions. For example, consider the customer input: "I VISITED YOUR RESTAURANT LAST NIGHT FOR CELEBRATING MY BIRTHDAY. THE SERVICE WAS VERY SLOW AND THE FOOD SERVED WAS VERY COLD. IT RUINED MY BIRTHDAY!!" A standard VA may not be trained to interpret the customers input and learn that the customer is disappointed or angry. However, a specialized VA may be trained to respond to the customer with the right level of empathy. In an illustrative example, the specialized VA may provide the following response for the service related complaint of the customer, 'WE REALLY DO APPRECIATE THIS FEEDBACK AND WE APOLOGIZE FOR THE INCONVENIENCE OCCURRED TO YOU. WE WOULD LIKE TO OFFER A COMPLEMENTARY DINNER FOR YOU AND YOUR FAMILY DURING YOUR NEXT VISIT TO OUR RESTAURANT.' When the customer receives such a generous response, his or her emotional state may immediately change from 'disappointment' to 'happy'.

Accordingly, the processor 202 determines if a specialized VA capable of assisting the customer and with the right level of empathy exists in the database 250 or not. If such a specialized VA exists in the database 250, then the processor 202 is configured to determine whether the specialized VA had previously interacted with the customer and what was the outcome of the previous interaction. If the specialized VA had previously interacted with the customer and if the outcome of the previous interaction was successful, implying that the customer concern was resolved, or the customer was satisfied with the response from the specialized VA, then the processor 202 may be configured to switch (or deflect) the interaction from the standard VA to the specialized VA. If the specialized VA had previously interacted with the customer and if the outcome of the interaction was not successful (for example, the customer was not satisfied with the interaction) or if it is determined that the specialized VA is not available for interaction, then the processor 202 may be configured to switch (or deflect) the interaction from the standard VA to a human agent. To that effect, the processor 202 may perform a look up operation in the database 250 for selecting a human agent from the registry of human agents stored therein and deflect the interaction to the selected human agent, who may be capable of resolving the customer query with the right level of compassion and expertise. In FIG. 4, this is exemplarily represented by a response 420 provided by a human agent 450 after deflection of the interaction from the standard VA 404 to the human agent 450. The response 420 is depicted to be associated with the text 'I UNDERSTAND YOUR CONCERN, LET ME CHECK THE CURRENT DELIVERY STATUS OF YOUR ORDER.' The deflection of chat interaction 402 is executed in the back-end without customer's knowledge and therefore, the chat console showing the chat interaction 402 displays the response 420 as received from the 'AGENT' of the enterprise.

In one example embodiment, the processor 202 may be configured to continue monitoring the customer's emotional state during the chat interaction 402 with the human agent 450. For example, if the human agent 450 conveys to the customer 406 after checking the delivery status of the order that the order is already dispatched and he may receive the item within one hour, the customer 406 may relax and be pleased to know that he will be receiving his order soon. In at least one example embodiment, the standard VA 404 may continuously learn from the answer provided by the human agent 450 (or the specialized VA not shown in FIG. 3), thus enhancing its own capability for a similar question in a future conversation.

Referring now to FIG. 2, in at least one example embodiment, the processor 202 is configured to create an emotional profile for each customer engaged in interaction with an agent of the enterprise. The emotional profile may be used for identifying the most appropriate VA for initiating the interaction with or deflecting the interaction to, as explained above. For example, the emotional profile of a customer may indicate that the customer was angry during his last two interactions with agents of the enterprise. Accordingly, when such a customer requests a subsequent interaction with an agent, the processor 202 may use the emotional profile to deflect a subsequent request for agent interaction directly to one of a human agent and a specialized VA capable of empathetically interacting with the customer as opposed to the standard VAs, who typically engage initially with the customers contacting customer support. An example emotional profile generated for a customer is depicted in FIG. 5.

Figure 5:
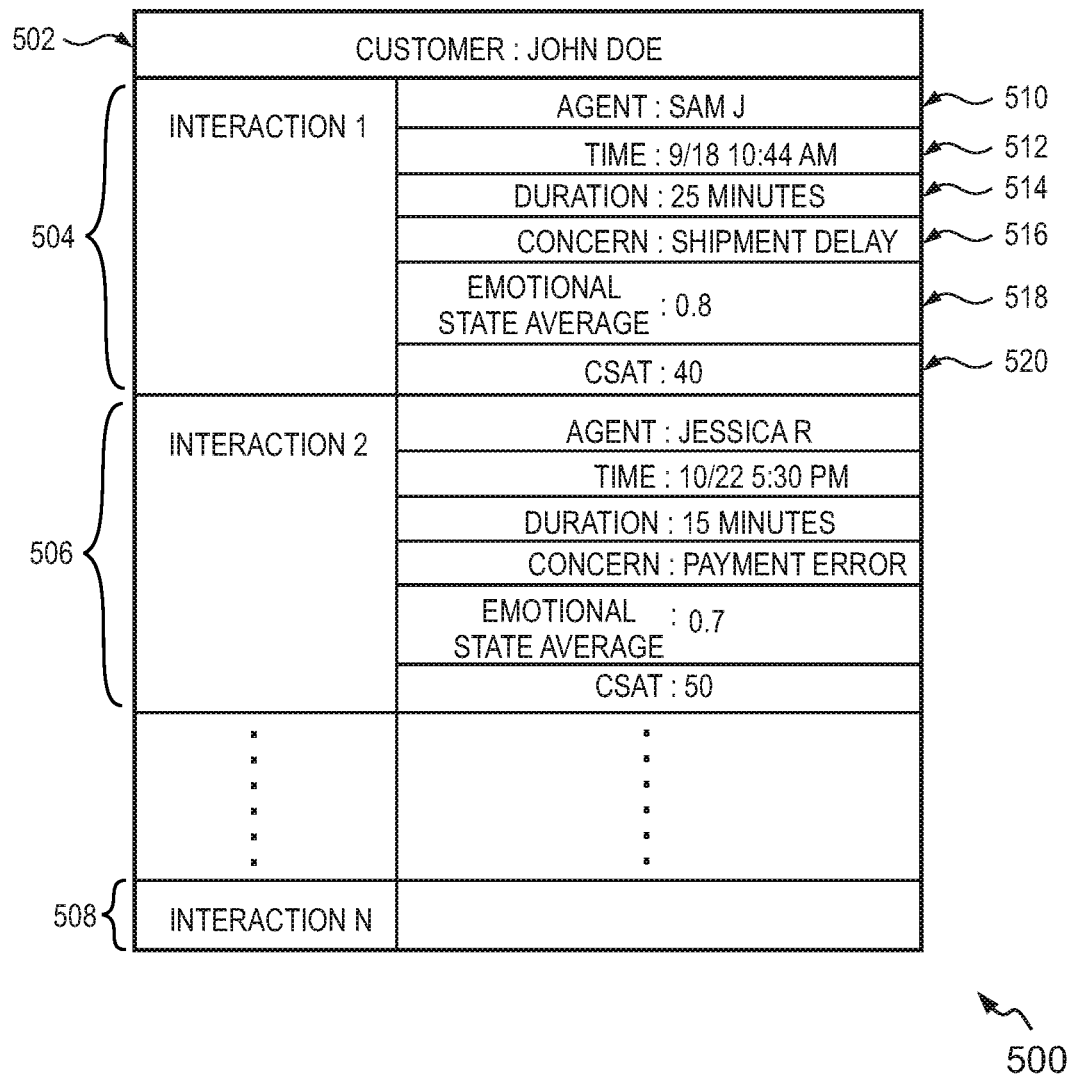
FIG. 5 shows a representation of an example emotional profile generated for a customer, in accordance with an embodiment of the invention.

FIG. 5 shows a representation of an example emotional profile 500 generated for a customer, in accordance with an embodiment of the invention. As explained with reference to FIG. 2, the processor 202 is configured to create an emotional profile for each customer engaged in interaction with an agent of the enterprise. The emotional profile may be used for identifying the most appropriate VA for initiating the interaction with or deflecting the interaction to.

The emotional profile 500 is depicted to include a header section 502 exemplarily depicted to display text 'CUSTOMER: JOHN DOE' implying that the emotional profile 500 is created for the customer John Doe. As can be seen, the customer John has engaged in multiple interactions with the agents of the enterprise for resolving a plurality of concerns at different time instances.

The emotional profile 500 is depicted to include a plurality of sections, such as sections 504, section 506 to section 508. Each section includes information related to one interaction of the customer John with an agent of the enterprise. The information related to the interaction may include the agent name, the time stamp of the interaction, duration of the interaction, the customer concern type, average emotional state score and customer satisfaction (CSAT) score. For example, in the section 504, the entries 510, 512, 514, 516, 518 and 520 show an agent name (depicted as 'SAM J'), a time of the interaction (depicted as September 2018 10:44 AM), interaction duration (depicted as '25 MINUTES'), concern (depicted as: 'SHIPMENT DELAY'), emotional state average (depicted as '0.8') and customer satisfaction score or CSAT (depicted as 40), respectively. Each subsequent agent interaction of the customer John may similarly result in inclusion of a section, such as the section 504, with respective entries in the emotional profile 500.

The CSAT and the average emotional state are indicative of the outcome of the respective previous interactions of the customer John with the agents of the enterprise. When the customer John requests another interaction with an agent of the enterprise, the information included in the emotional profile 500 may be extracted and based on the extracted information, the customer John may be directed to an appropriate agent. For example, if the values representative of the emotional state of the customer John, averaged over several inputs during the respective interaction, is indicative of the customer John being in a non-neutral state in previous interactions, then the processor 202 of the apparatus 200 may be configured to directly deflect the new request for interaction to either a specialized VA or a human agent capable of empathetically interacting with the customer John. However, if the values of the emotional state of the customer John, averaged over several inputs during the respective interaction, is indicative of the customer John mostly being in a neutral state in previous interactions, then the processor 202 of the apparatus 200 may be configured to direct the request to a standard VA as per regular procedure.

A method for managing agent interactions with customers of an enterprise is explained next with reference to FIG. 6.

Figure 6:
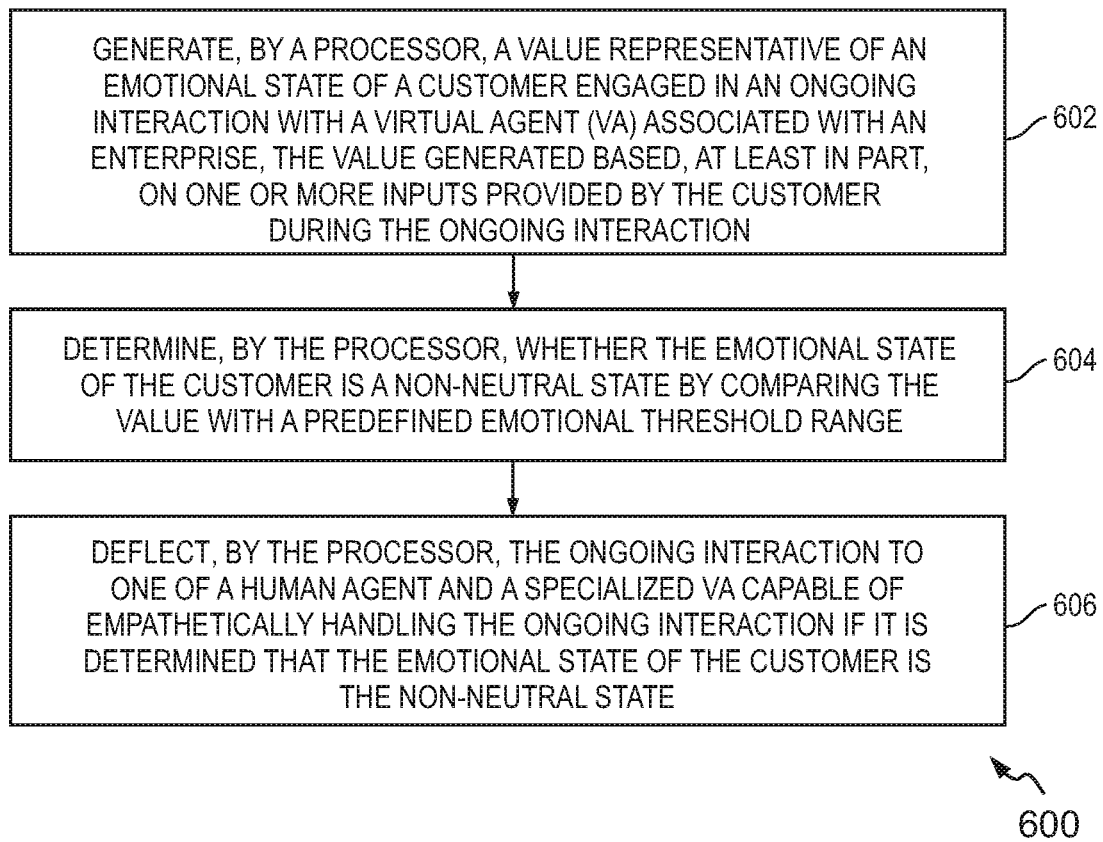
FIG. 6 is a flow diagram of a method for managing an agent interaction with an enterprise customer, in accordance with an embodiment of the invention.

FIG. 6 is a flow diagram of an example method 600 for facilitating managing an agent interaction with an enterprise customer, in accordance with an embodiment of the invention. The method 600 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the apparatus 200. The operations of the method 600 can be described and/or practiced by using any system other than the apparatus 200. The method 600 starts at operation 602.

At operation 602 of the method 600, a value representative of an emotional state of a customer engaged in an ongoing interaction with a virtual agent (VA) associated with the enterprise is generated by a processor, such as the processor 202 of the apparatus 200 shown in FIG. 2. The term 'emotional state of the customer' as used herein refers to an emotion that the customer is currently experiencing. In an illustrative example, the emotional state of the customer may be 'angry' if the customer is currently experiencing the emotion 'anger'. In another illustrative example, the emotional state of the customer may be 'happy' if the customer is currently experiencing the emotion 'happiness'. The customers of the enterprise may exhibit a range of emotions and sentiments during the course of their interactions with the agents of the enterprise.

In one embodiment, customer interaction inputs are received in an ongoing manner and in substantially real-time by the processor. The processor is configured to perform Natural Language Processing (NLP) of the one or more inputs provided by the customer during the ongoing interaction to identify at least one parameter. More specifically, the processor is configured to extract emotion bearing words and derive parameters from the extracted words. Such derivation of parameters from customer interaction inputs is referred to herein as 'identification of parameters'. The processor is configured to provide the identified parameters as an input to at least one emotion detection classifier. In an illustrative example, plurality of past interactions in which individual interaction inputs of the customers are manually tagged with emotions by human agents may be used to train a ML model, such as a Hidden Markov Model, to serve as the emotion detection classifier. The emotion detection classifier may be trained to receive parameters derived from customer inputs as an input and generate a numerical value as an output.

In at least some embodiments, in addition to analyzing the words typed or spoken by the customer, may also analyze other aspects related to the VA interaction with the customer for determining the emotional state of the customer. Some non-exhaustive examples of such aspects include emoticons selected to express sentiments during interactions, the speech pattern, e.g. pitch of the speech, the typing pattern, e.g. typing speed, movement of the devices used for interactions, e.g. the customer is walking at a faster pace while interacting using a mobile phone, facial expressions of the customer, and the like. Such information may be retrieved from a plurality of sensors such as, but not limited to, a camera, a microphone, an accelerometer, a GPS sensor, a pedometer, a pressure sensor, a heart rate monitor, and the like, present in the customer's device. The processor may further be configured to input such information as additional parameters to the emotion detection classifier for generating the emotional state of the customer, i.e. for generating a numerical value representative of the emotional state of the customer. The generation of the value representative of the emotional state of the customer is explained with reference to FIG. 3 and is not explained again herein.

At operation 604 of the method 600, it is determined by the processor whether the emotional state of the customer is a non-neutral state by comparing the value, i.e. generated value representative of the emotional state of the customer, with a predefined emotional threshold range. In an embodiment, the predefined emotional threshold range includes at least a first predefined threshold value and a second predefined threshold value, where the second predefined threshold value less than the first predefined threshold value. The emotional state of the customer is determined to be the non-neutral state if the value is greater than the first predefined threshold value or less than the second predefined threshold value. The emotional state of the customer is determined to be a neutral state if the value is less than the first predefined threshold value and greater than the second predefined threshold value. In an illustrative example, if the value output by the emotion detection classifier is greater than a first predefined threshold value (for example above 0.6) or less than a second predefined threshold value (for example, below 0.4), then the customer is identified to be in non-neutral state. However, if the value output by the emotion detection classifier is less than the first predefined threshold value but more than the second predefined threshold value (for example, from 0.4 to 0.6) then the customer is determined to be in a neutral state. The predefined threshold values used for comparing the numerical output of the classifiers may be configurable features. The predefined emotional threshold range including the first predefined threshold value and the second predefined threshold value may be selected to be any value based on machine learning and/or empirical research.

At operation 606 of the method 600, the ongoing interaction is deflected by the processor to one of a human agent and a specialized VA capable of empathetically handling the ongoing interaction if it is determined that the emotional state of the customer is the non-neutral state. More specifically, if the processor determines that the customer's emotional state is a non-neutral state, then the processor may be configured to determine if the interaction may be switched, i.e. deflected to a specialized VA equipped to assist the customer with the right level of empathy. To that effect, the processor may be configured to check the registry of specialized VAs in a database, such as the database 250 shown in FIG. 2, to determine whether a specialized VA equipped to empathetically engage with a customer in a particular emotional state exists or not. Each specialized VA may be trained to interact with customers exhibiting a particular emotion or a set of emotions. If such a specialized VA exists in the database, then the processor is configured to determine whether the specialized VA had previously interacted with the customer and what was the outcome of the previous interaction. If the specialized VA had previously interacted with the customer and if the outcome of the previous interaction was successful, implying that the customer concern was resolved or the customer was satisfied with the response from the specialized VA, then the processor may be configured to switch (or deflect) the interaction from the standard VA to the specialized VA. If the specialized VA had previously interacted with the customer and if the outcome of the interaction was not successful (for example, the customer was not satisfied with the interaction) or if it is determined that the specialized VA is not available for interaction, then the processor may be configured to switch (or deflect) the interaction from the standard VA to a human agent. To that effect, the processor may perform a look up operation in the database for selecting a human agent from the registry of human agents stored therein and deflect the interaction to the selected human agent, who may be capable of resolving the customer query with the right level of compassion and expertise.

Such management of agent interactions ensures that the customers continue to get high quality and satisfactory responses irrespective of interacting with a virtual agent or a human agent.

Figure 7:
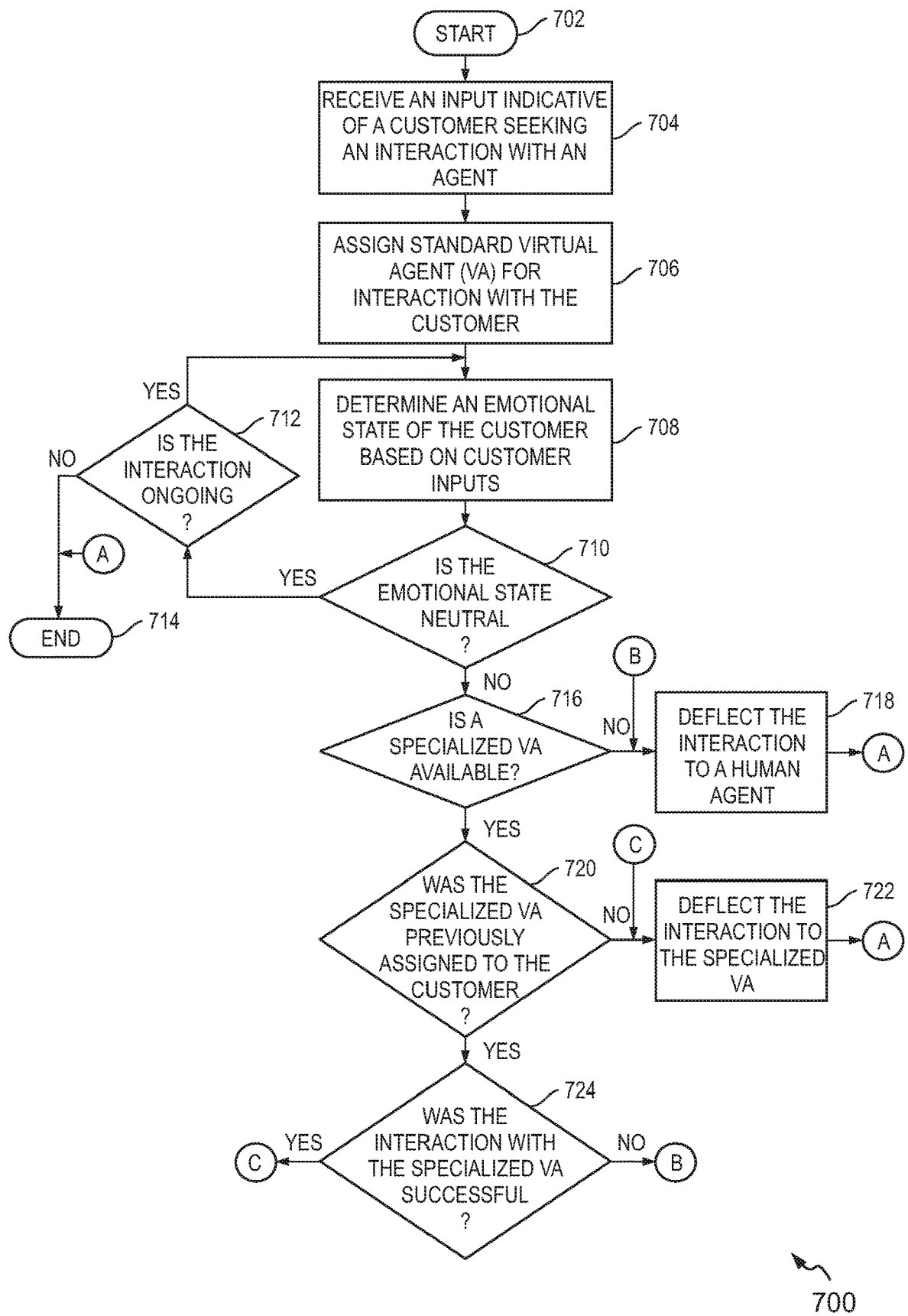
FIG. 7 is a flow diagram of a method for managing an agent interaction with an enterprise customer, in accordance with another embodiment of the invention.

FIG. 7 is a flow diagram of an example method 700 for managing an agent interaction with an enterprise customer, in accordance with another embodiment of the invention. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the apparatus 200. It is noted that, the operations of the method 700 can be described and/or practiced by using any system other than the apparatus 200. The method 700 starts at operation 702.

At operation 704 of the method 700, an input indicative of a customer seeking an interaction with an agent of an enterprise, is received. The input may be provided by providing a click input or touch input on a widget offering agent assistance on a Website as explained with reference to FIG. 1.

At operation 706 of the method 700, a standard Virtual Agent (VA) is assigned for interaction with the customer.

At operation 708 of the method 700, an emotional state of the customer is determined based on the customer inputs during the ongoing interaction with the VA. The determination of the emotional state may be performed based on parameters, such as words typed or spoken during the interaction, customer's facial expressions, emoticons used by the customer, typing speed of the customer, and the like. Such parameters may be fed to an emotion detection classifier, which may be trained to provide a numerical value, representative of the emotional state of the customer. The generation of the value representative of the emotional state of the customer may be performed as explained with reference to operation 602 of the method 600 and is not explained again herein.

At operation 710, it is determined if the emotional state of the customer is a neutral state. As explained with reference to operation 604 of the method 600, the numerical value may be compared with predefined emotional threshold range to determine if the emotional state of the customer is a neutral state or a non-neutral state. If the emotional state of the customer is a neutral state, the standard VA is permitted to continue the interaction with the customer and operation 712 is performed.

At operation 712 of the method 700, it is determined whether the standard VA interaction with the customer is ongoing. If the interaction is not ongoing (i.e. the interaction has ended), then the method 700 ends at 714. If the interaction is ongoing, then operation 708 onwards is repeated.

If it is determined that emotional state of the customer is a non-neutral state, then operation 716 is performed. At operation 716 of the method 700, it is determined if a specialized VA is available for interaction with the customer for the determined emotional state. If it is determined at operation 716 of the method 700 that the specialized VA is not available, then the interaction is deflected to the human agent at operation 718. The human agent may be configured to take the conversation with the customer to a graceful closure and the method 700 ends at operation 714.

If it is determined at operation 716 that the specialized VA is available, then at operation 720 of the method 700, it is checked if the specialized VA has been assigned previously for interaction with the customer or not. If the specialized VA was previously assigned to the customer, then at operation 724 of the method 700, an outcome of the previous interaction is checked to determine if the interaction of the specialized VA with the customer was successful or not. If the outcome was not successful, then operation 718 of the method 700, is performed. If it is determined that the interaction with the specialized VA was successful at operation 724, then the interaction is deflected to the specialized VA at operation 722. The specialized VA may be configured to take the conversation with the customer to a graceful closure and the method 700 ends at operation 714.

Various embodiments disclosed herein provide numerous advantages. The techniques disclosed herein suggest techniques for managing agent interactions with customers of an enterprise. The techniques suggested herein ensure that the customers continue to get high quality and satisfactory responses irrespective of interacting with a virtual agent or a human agent. Further, as the context of the conversation and the reason of deflection are forwarded to the apparatus on each deflection, the VA continues to learn how to thoughtfully respond to the customer based on his/her current emotional state. Moreover, an empathetic emotional connect built with the customer helps in increasing the Net Promoter Score (NPS) and the Customer Satisfaction Score (CSAT) of the enterprise.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an apparatus, as described and depicted in FIG. 2. A computer-readable medium may include a computer-readable storage medium that may be any media or means that can contain or store the instructions for use by or in connection with an instruction execution system, system, or device, such as a computer.

Although the invention has been described with reference to specific exemplary embodiments, various modifications and changes may be made to these embodiments without departing from the broad spirit and scope of the present invention. For example, the various operations, blocks, etc., described herein may be enabled and operated using hardware circuitry, for example complementary metal oxide semiconductor (CMOS) based logic circuitry; firmware; software; and/or any combination of hardware, firmware, and/or software, for example embodied in a machine-readable medium. For example, the apparatuses and methods may be embodied using transistors, logic gates, and electrical circuits, for example application specific integrated circuit (ASIC) circuitry and/or in Digital Signal Processor (DSP) circuitry.

Particularly, the apparatus 200 and its various components such as the processor 202, the memory 204, the I/O module 206, the communication module 208, the database 250 and the centralized circuit system 210 may be enabled using software and/or using transistors, logic gates, and electrical circuits, for example integrated circuit circuitry such as ASIC circuitry. Various embodiments of the invention may include one or more computer programs stored or otherwise embodied on a computer-readable medium, wherein the computer programs are configured to cause a processor or computer to perform one or more operations, for example operations explained herein with reference to FIGS. 6 and 7. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media, such as floppy disks, magnetic tapes, hard disk drives, etc.; optical magnetic storage media, e.g. magneto-optical disks; CD-ROM (compact disc read only memory); CD-R (compact disc recordable); CD-R/W (compact disc rewritable); DVD (Digital Versatile Disc); BD (Blu-ray (registered trademark) Disc); and semiconductor memories, such as mask ROM, PROM (programmable ROM), EPROM (erasable PROM), flash ROM, RAM (random access memory), etc. Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line, e.g. electric wires, and optical fibers, or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for managing agent interactions with customers of an enterprise, the method comprising:

generating, by a processor, a value representative of an emotional state of a customer engaged in an ongoing interaction with a virtual agent (VA) associated with the enterprise, the value generated based, at least in part, on one or more inputs provided by the customer during the ongoing interaction;

determining, by the processor, whether the emotional state of the customer is a non-neutral state by comparing the value with a predefined emotional threshold range;

deflecting, by the processor, the ongoing interaction to one of a human agent and a specialized VA capable of empathetically handling the ongoing interaction when it is determined that the emotional state of the customer is the non-neutral state;

determining, by the processor, an availability of the specialized VA capable of empathetically handling the ongoing interaction, wherein the availability of the specialized VA is determined subsequent to determining the emotional state of the customer to be the non-neutral state and prior to deflecting the ongoing interaction;

when the specialized VA is determined to be unavailable, deflecting the ongoing interaction to the human agent;

when the specialized VA is determined to be available, determining by the processor, whether the specialized VA has previously engaged in an interaction with the customer;

if the specialized VA has previously engaged in the interaction with the customer, determining, by the processor, if an outcome of the previous interaction was successful;

deflecting the ongoing interaction from the VA to the specialized VA if the outcome of the previous interaction was successful; and deflecting the ongoing interaction from the specialized VA to the human agent if the outcome of the previous interaction was unsuccessful.

2. The method as claimed in claim 1, wherein the ongoing interaction between the VA and the customer is allowed to continue without deflection when the emotional state of the customer is determined to be a neutral state.

3. The method as claimed in claim 1, wherein generating the value representative of the emotional state of the customer comprises:

performing, by the processor, natural language processing of the one or more inputs provided by the customer during the ongoing interaction to identify at least one parameter; and providing, by the processor, the at least one parameter as an input to at least one emotion detection classifier to generate the value corresponding to the emotional state of the customer as an output.

4. The method as claimed in claim 3, further comprising:

analyzing during the ongoing interaction, by the processor, at least one of a speech pattern of the customer, a typing pattern of the customer, facial expressions of the customer, emoticons used by the customer to express sentiments, and a movement of an electronic device used by the customer for interacting with the VA to identify a respective parameter; and providing the respective parameter to the at least one emotion detection classifier as an additional input for generating the value corresponding to the emotional state of the customer.

5. The method as claimed in claim 1, further comprising:

generating, by the processor, an emotional profile of the customer engaged in the ongoing interaction with the VA; and using the generated emotional profile of the customer for deflecting a subsequent request for an agent interaction directly to one of the human agent and the specialized VA capable of empathetically interacting with the customer.

6. A computer-implemented method for managing agent interactions with customers of an enterprise, the method comprising:

generating, by a processor, a value representative of an emotional state of a customer engaged in an ongoing interaction with a virtual agent (VA) associated with the enterprise, the value generated based, at least in part, on one or more inputs provided by the customer during the ongoing interaction;

determining, by the processor, whether the emotional state of the customer is a non-neutral state by comparing the value with a predefined emotional threshold range; and deflecting, by the processor, the ongoing interaction to one of a human agent and a specialized VA capable of empathetically handling the ongoing interaction when it is determined that the emotional state of the customer is the non-neutral state;

wherein the predefined emotional threshold range comprises at least a first predefined threshold value and a second predefined threshold value, the second predefined threshold value less than the first predefined threshold value; and determining the emotional state of the customer to be the non-neutral state when the value is greater than the first predefined threshold value or less than the second predefined threshold value.

7. An apparatus for managing agent interactions with customers of an enterprise, the apparatus comprising:

a memory for storing instructions; and a processor configured to execute the instructions and thereby cause the apparatus to at least perform the steps of:

generating a value representative of an emotional state of a customer engaged in an ongoing interaction with a virtual agent (VA) associated with the enterprise, the value generated based, at least in part, on one or more inputs provided by the customer during the ongoing interaction;

determining whether the emotional state of the customer is a non-neutral state by comparing the value with a predefined emotional threshold range;

deflecting the ongoing interaction to one of a human agent and a specialized VA capable of empathetically handling the ongoing interaction if it is determined that the emotional state of the customer is the non-neutral state;

determining an availability of the specialized VA capable of empathetically handling the ongoing interaction;

determining the availability of the specialized VA subsequent to determining the emotional state of the customer to be the non-neutral state and prior to deflecting the ongoing interaction;

deflecting the ongoing interaction to the human agent when the specialized VA is determined to be unavailable;

when the specialized agent is determined to be available, determining whether the specialized VA has previously engaged in an interaction with the customer;

if the specialized VA has previously engaged in the interaction with the customer, determining if an outcome of the previous interaction was successful;

deflecting the ongoing interaction from the VA to the specialized VA if the outcome of the previous interaction was successful; and deflecting the ongoing interaction from the VA to the human agent if the outcome of the previous interaction was unsuccessful.

8. The apparatus as claimed in claim 7, wherein the apparatus is further caused to:

allow the ongoing interaction between the VA and the customer is allowed to continue without deflection when the emotional state of the customer is determined to be a neutral state.

9. The apparatus as claimed in claim 7, wherein for generating the value representative of the emotional state of the customer, the apparatus is further caused to:

perform natural language processing of the one or more inputs provided by the customer during the ongoing interaction to identify at least one parameter;

analyze during the ongoing interaction, at least one of a speech pattern of the customer, a typing pattern of the customer, facial expressions of the customer, and a movement of an electronic device used by the customer for interacting with the VA to identify a respective parameter; and provide the at least one parameter and the respective parameter to at least one emotion detection classifier to generate the value corresponding to the emotional state of the customer as an output.

10. The apparatus as claimed in claim 7, wherein the apparatus is further caused to:
  generate an emotional profile of the customer engaged in the ongoing interaction with the VA; and
  use the generated emotional profile of the customer for deflecting a subsequent request for an agent interaction directly to one of the human agent and the specialized VA capable of empathetically interacting with the customer.

11. An apparatus for managing agent interactions with customers of an enterprise, the apparatus comprising:
  a memory for storing instructions; and
  a processor configured to execute the instructions and thereby cause the apparatus to at least perform the steps of:
    generating a value representative of an emotional state of a customer engaged in an ongoing interaction with a virtual agent (VA) associated with the enterprise, the value generated based, at least in part, on one or more inputs provided by the customer during the ongoing interaction;
    determining whether the emotional state of the customer is a non-neutral state by comparing the value with a predefined emotional threshold range; and
  deflecting the ongoing interaction to one of a human agent and a specialized VA capable of empathetically handling the ongoing interaction if it is determined that the emotional state of the customer is the non-neutral state;
    wherein the predefined emotional threshold range comprises at least a first predefined threshold value and a second predefined threshold value, the second predefined threshold value less than the first predefined threshold value; and
    wherein the apparatus is further caused to determine the emotional state of the customer to be the non-neutral state when the value is greater than the first predefined threshold value or less than the second predefined threshold value.

12. A computer-implemented method for managing agent interactions with customers of an enterprise, the method comprising:
  performing, by a processor, natural language processing of one or more inputs provided by a customer during an ongoing interaction with a virtual agent (VA) associated with the enterprise, the natural language processing performed to identify at least one parameter;
  generating, by the processor, a value representative of an emotional state of the customer based, at least in part, on the at least one parameter;
  determining, by the processor, whether the emotional state of the customer is a non-neutral state by comparing the value with a predefined emotional threshold range;
    wherein the predefined emotional threshold range comprises at least a first predefined threshold value and a second predefined threshold value, the second predefined threshold value less than the first predefined threshold value; and
    wherein the apparatus is further caused to determine the emotional state of the customer to be the non-neutral state when the value is greater than the first predefined threshold value or less than the second predefined threshold value determining, by the processor, an availability of a specialized VA capable of empathetically handling the ongoing interaction when it is determined that the emotional state of the customer is the non-neutral state;
  when the specialized VA is determined to be available, determining by the processor, whether the specialized VA has previously engaged in an interaction with the customer;
  if the specialized VA has previously engaged in the interaction with the customer, determining, by the processor, if an outcome of the previous interaction was successful;
  deflecting, by the processor, the ongoing interaction from the VA to the specialized VA if the outcome of the previous interaction was successful; and
  deflecting the ongoing interaction from the VA to a human agent if the specialized VA is determined to be unavailable or if the outcome of the previous interaction was unsuccessful.

13. The method as claimed in claim 12, further comprising:
  analyzing during the ongoing interaction, by the processor, at least one of a speech pattern of the customer, a typing pattern of the customer, facial expressions of the customer, and a movement of an electronic device used by the customer for interacting with the VA to identify a respective parameter; and
  providing, by the processor, the at least one parameter and the respective parameter to at least one emotion detection classifier to generate the value corresponding to the emotional state of the customer as an output.

14. The method as claimed in claim 12, further comprising:
  generating, by the processor, an emotional profile of the customer engaged in the ongoing interaction with the VA; and
  using the generated emotional profile of the customer for deflecting a subsequent request for an agent interaction directly to one of the human agent and the specialized VA capable of empathetically interacting with the customer.

* * * * *